United States Patent [19]

Heise et al.

[11] Patent Number: 5,087,191
[45] Date of Patent: Feb. 11, 1992

[54] EMBOSSING CALENDER ASSEMBLY

[75] Inventors: Wolfgang Heise; Kurt Trzynka; Andreas Kubik, all of Hanover, Fed. Rep. of Germany

[73] Assignee: Hermann Berstorff Maschinenbau GmbH, Hanover, Fed. Rep. of Germany

[21] Appl. No.: 639,265

[22] Filed: Jan. 10, 1991

[30] Foreign Application Priority Data

Jan. 17, 1990 [DE] Fed. Rep. of Germany ...... 4001105

[51] Int. Cl.$^5$ .............................................. B29C 59/00
[52] U.S. Cl. ..................................... 425/335; 425/363; 425/385
[58] Field of Search .................... 264/175, 284, 293; 425/335, 363, 367, 385

[56] References Cited

U.S. PATENT DOCUMENTS

| 2,551,966 | 5/1951 | Pierce | 264/284 |
|---|---|---|---|
| 3,581,340 | 6/1971 | Thieme | 425/363 |
| 4,124,349 | 11/1978 | Lehmann | 425/363 |
| 4,259,285 | 3/1981 | Baumgartl et al. | 264/284 |
| 4,311,658 | 1/1982 | Nicoll | 264/175 |
| 4,379,774 | 4/1983 | Anderson et al. | 264/284 |
| 4,632,655 | 11/1986 | Benkwitz | 425/186 |
| 4,655,703 | 4/1987 | Heise | 425/335 |
| 4,744,936 | 5/1988 | Bittner, Jr. | 425/335 |
| 4,784,596 | 11/1988 | Heise | 425/367 |
| 4,787,835 | 11/1988 | Cavanaugh | 425/367 |

FOREIGN PATENT DOCUMENTS 1729043 6/1971 Fed. Rep. of Germany .
3506256 6/1986 Fed. Rep. of Germany .

OTHER PUBLICATIONS

Kraftanlagen Heidelberg, Projektinformation (Product Information) re O'Sullivan Corporation, Winchester, VA/USA, 1989.

Primary Examiner—Jay H. Woo
Assistant Examiner—C. Scott Bushey
Attorney, Agent, or Firm—Foley & Lardner

[57] ABSTRACT

An embossing calender arrangement capable of embossing a thermoplastic plastics material film on either of its two major surfaces or both surfaces as desired, the embossing calender including two embossing roller sets. The roller sets are each mounted with their axes extending horizontally in one embodiment, in a common frame. The frame is horizontally displaceable beneath a film transfer arrangement by selectively displacing the frame and inserting the film into either one of the embossing nips defined in the roller sets or into both nips successively, the film can be embossed unilaterally on either of its two major surfaces or bilaterally without necessitating major adjustment of the arrangement.

5 Claims, 3 Drawing Sheets

EMBOSSING CALENDER ASSEMBLY

FIELD OF THE INVENTION

The present invention relates to an embossing calender assembly for thermoplastic plastics materials. More particularly, the present invention relates to an embossing calender assembly which can be used for embossing one or both sides of a thermoplastic plastics material film as desired.

BACKGROUND OF THE INVENTION AND PRIOR ART DISCUSSION

In German Offenlegungsschrift No. 17 29 043, there is disclosed a calendering system for thermoplastic plastics material films. Such system comprises calender for producing the film and an embossing calender disposed subsequent thereto. The embossing calender comprises an embossing roller, a counter-roller having a resilient coating, and a pressure roller. All of these rollers are rotatably mounted in a displaceable frame.

In calendering systems for the production of films of, for example, polyvinyl chloride, the film is drawn off by a transfer arrangement in a ratio of substantially one to two immediately after leaving the calender.

After the drawing operation, the film passes into the embossing calender. The counter-roller, which is provided with a resilient surface coating, is forced, by the embossing roller, towards the drive roller, whereby all of the rollers are simultaneously caused to rotate.

During the embossing operation, it is particularly important that the film enters the nip between the counter-roller and the embossing roller at right angles to the plane containing the longitudinal axes of these two rollers. Before entering the nip, it is important that the film does not contact either the embossing roller or counter-roller.

To produce an extensive range of films on a calendering system, the system must be capable of embossing either of the two surfaces and of embossing both surfaces of the film. Hitherto, when it was desired to emboss the lower, rather than the upper surface, of a film, the system required substantial alteration. The change-over process necessitated complete dismantling of the embossing calender to ensure the proper direction of guidance of the film into the embossing nip, and to ensure that there was no prior contact of the film with either the embossing roller or the counter-roller, as described hereinbefore.

This change-over process meant that the calender line was out of commission for at least one working day.

To overcome the above-mentioned disadvantage, the invention disclosed in German Patent Specification No. 35 06 256 was devised. In such arrangement, the embossing roller, the counter-roller and the auxiliary roller are located in a displaceable frame. The frame is pivotable into a vertical location about a pivot point situated in the displacement path of the frame. Such device does, in fact, permit either surface of the film to be embossed as desired, without entailing time-consuming adaptation of the system. However, it is not possible, using such an arrangement, to emboss both surfaces of the film in a single production operation. To emboss both surfaces, the first surface is initially embossed and, the film then has to be fed to a second heating and embossing system.

In addition, a calendering system provided with twin embossing devices arranged in tandem has been disclosed for embossing both surfaces of polyvinyl chloride films.

In such an arrangement, the film is initially fed to a first embossing mechanism comprising an embossing roller, a counter-roller and an auxiliary roller. Such rollers are disposed in a generally horizontal array. The feeding of the film is effected by a calender through the intermediary of a transfer arrangement which comprises a plurality of rollers disposed adjacent one another. A second transfer system receives the film after it has been embossed on one surface and advances it on to a second embossing mechanism comprising an embossing roller, a counter-roller and an auxiliary roller. The rollers, in this latter arrangement, are disposed in a generally vertical array. The second surface of the film is thus embossed and a third transfer system receives the film now embossed on both sides, and advances it for any desired subsequent treatment.

Such a calendering system with two embossing systems in tandem with one another suffers from the disadvantage that it is necessary to provide a comparatively complex, cost-intensive, second roller frame having an additional auxiliary roller for the second embossing mechanism. In addition, it is only possible to emboss a single surface of the film in such an arrangement if the second embossing mechanism can be pivoted away from the path of travel of the film. In such circumstances, the film must pass from the final roller of the second transfer system direct to the first roller of the third transfer system. Inevitably, the film will sag further in this region in a disadvantageous manner. An additional disadvantage of this system is that it occupies a relatively large space. It will be apparent sufficient space must be available to pivot the second embossing mechanism out of the path of the film.

OBJECT OF THE INVENTION

The present invention seeks to provide a compact calendering system, which is capable of embossing either of the two surfaces or both surfaces of a thermoplastic plastics material film as desired by means of a minor readjustment which is both simple and rapid to achieve.

SUMMARY OF THE INVENTION

According to the present invention, there is provided an embossing calender arrangement for embossing thermoplastic plastics material films comprising a film calender for producing a said film having first and second opposed major surfaces, an embossing calender assembly receiving said produced film and embossing at least one of said surfaces of said film, and transfer means for transferring said film from said film calender to said embossing calender assembly, through said assembly and from said assembly for further processing, wherein said embossing calender assembly comprises a first roller set defining a first roller nip whereby passage of said film through said first roller nip causes embossing of said first major surface, second roller means defining a second roller nip whereby passage of said film through said second roller nip causes embossing of said second major surface, means mounting said first roller set and said second roller set whereby the axes of sad rollers in said set preferably extend substantially horizontally, common frame means including both said means mounting said first roller set and said means mounting said second roller set and further including means for displacing said frame means horizontally with respect to said transfer means, said transfer arrangement being disposed above said frame means, whereby displacement of said frame means provides a first mode of embossing wherein said first surface of said film is unilaterally embossed in said first roller nip, a second mode of embossing wherein said second surface of said film is unilaterally embossed in said second roller nip, and a third mode of embossing wherein said first and said second surfaces are sequentially embossed in said first and said second roller nips.

Preferably, said first roller set comprises a counter-roller, said counter-roller including a peripheral curved surface and resilient coating means formed on said curved surface; an embossing roller disposed adjacent said counter-roller, said embossing roller and said counter-roller jointly defining said first roller nip and a pressure roller disposed adjacent said counter-roller and in contact therewith.

Advantageously, said second roller set comprises a counter-roller, said counter-roller including a peripheral curved surface and resilient coating means formed on said curved surface, drive means operatively connected to said counter-roller, and an embossing roller disposed adjacent said counter-roller, said embossing roller and said counter-roller jointly defining said second roller nip.

In this latter case, it is desirable if the arrangement additionally includes pivot means mounting said counter-roller for enabling pivotal movement of said counter-roller in a direction towards and away from said embossing roller, said pivot means comprising lever means operatively connected to said counter-roller, a pivot axis mounting said lever means, and hydraulic piston and cylinder means acting on said lever means.

Further preferably, said means mounting said first roller set comprises first bearing means, said first bearing means being disposed in a first substantially horizontal plane in said frame, and said means mounting said second roller set comprises second bearing means, said second bearing means being disposed in a second substantially horizontal plane, wherein said first and said second horizontal planes are different.

The horizontal disposition of the two sets of rollers of the embossing calender assembly in a common frame, which frame is displaceable horizontally beneath the film transfer arrangement, permits the construction of an embossing arrangement for embossing either one or both surfaces of a film in a compact manner.

In order to effect a change-over from one of the embossing modes to another of the modes, it is merely necessary to displace the displaceable frame and to insert the new film into the embossing nip of the first roller set or that of the second roller set or into both nips sequentially, as desired, by utilising the transfer means.

BRIEF DESCRIPTION OF THE DRAWING

One embodiment of an embossing calender assembly in accordance with the present invention will be further described, by way of example, with reference to the accompanying drawings, in which.

DESCRIPTION OF PREFERRED EMBODIMENTS

Figure 1:
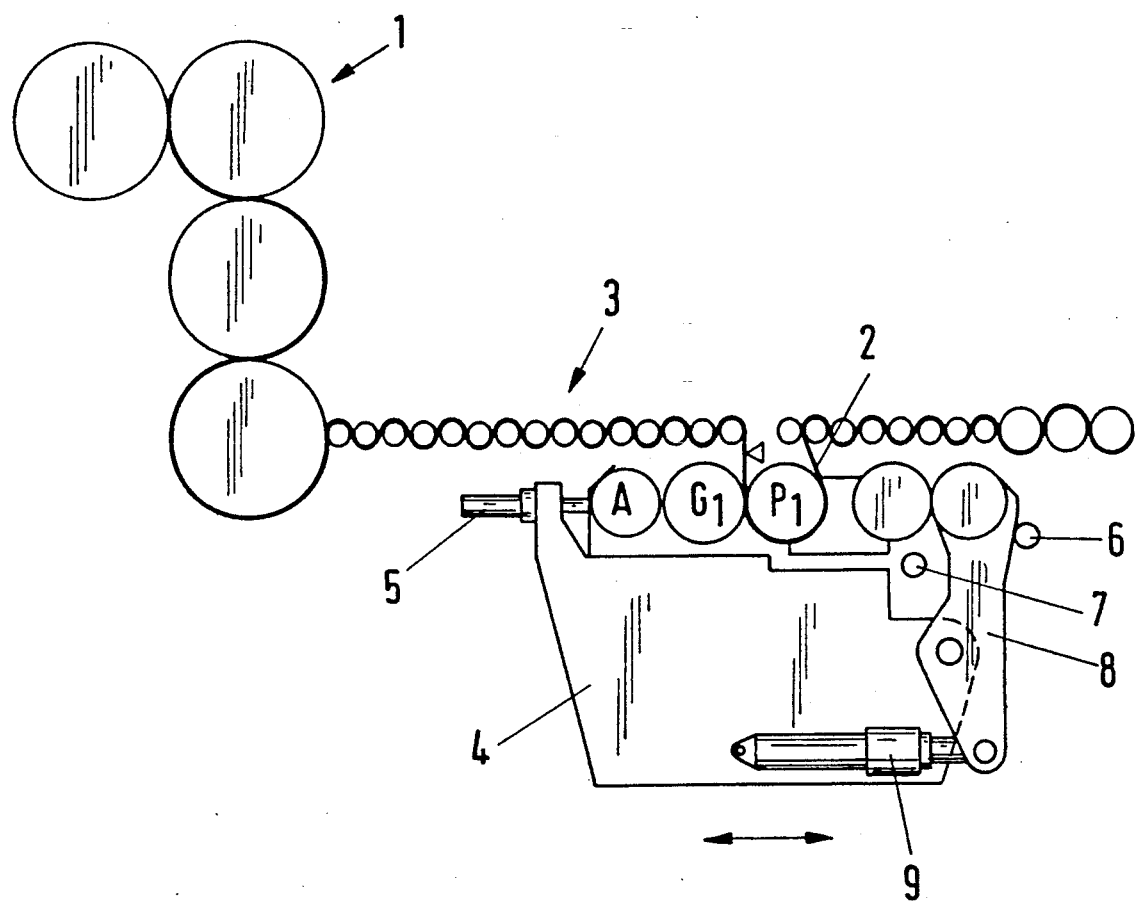
FIG. 1 shows, schematically, an embossing calender assembly in its position of use to emboss a first surface of a thermoplastic plastics material film.

In FIG. 1, there is schematically shown a calendering system, which comprises a calender 1 for producing a thermoplastic film 2, and a transfer arrangement 3 which removes the film 2 from the calender 1 and advances it to a double embossing calender. The embossing calender is disposed on a horizontally displaceable frame 4.

The double embossing calender includes a first embossing calender assembly in which the film 2, conveyed by the transfer arrangement 3, is directly guided into the nip between an embossing roller $P_1$ and a counter-roller $G_1$ provided with a resilient coating. The counter-roller $G_1$ is driven by a pressure or auxiliary roller A which, in turn, is forced towards the counter-roller by a hydraulic piston and cylinder arrangement 5. The auxiliary roller, the counter-roller and the embossing roller are mounted adjacent one another on the frame 4 with their axes lying in a horizontal plane.

In this first embossing calender, the film 2 is unilaterally embossed on the surface indicated by the unreferenced arrowhead in FIG. 1. The embossed film is then collected by the transfer arrangement 3, and advanced for further processing.

Figure 2:
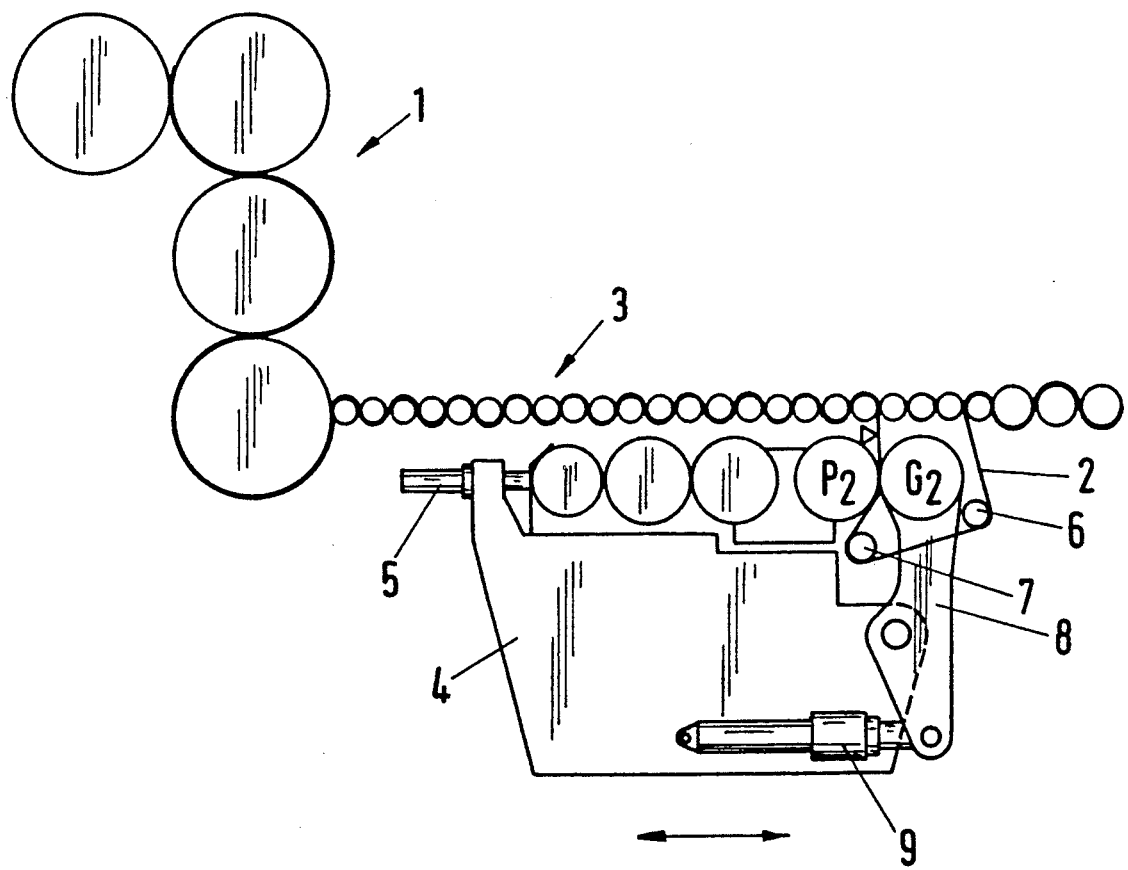
FIG. 2 shows a similar view of the system of FIG. 1 but in its position of use for embossing the second surface of a film.

FIG. 2 shows the system in its position of use where, for any reason, it is decided to emboss the other surface of a film 2 to that embossed by the first calender arrangement. This is achieved by means of a second embossing calender comprising an embossing roller $P_2$ and a counter-roller $G_2$. The frame 4 is displaced beneath the transfer arrangement 3 in such a manner that the film is insertable into the nip between the embossing roller $P_2$ and the counter-roller $G_2$. The rollers $P_2$ and $G_2$ are mounted in the frame 4 adjacent to one another with their axes extending horizontally. After the embossing has occurred, with the surface which has been embossed being indicated by the unreferenced arrowhead in FIG. 2, the film 2 is advanced to the transfer arrangement 3 through the intermediary of the guide rollers 6 and 7 for further conveyance. The counter-roller $G_2$, in this second embossing calender is directly driven and is forced towards the embossing roller $P_2$ by a hydraulic piston and cylinder arrangement 9 through the intermediary of a lever arm 8.

Figure 3:
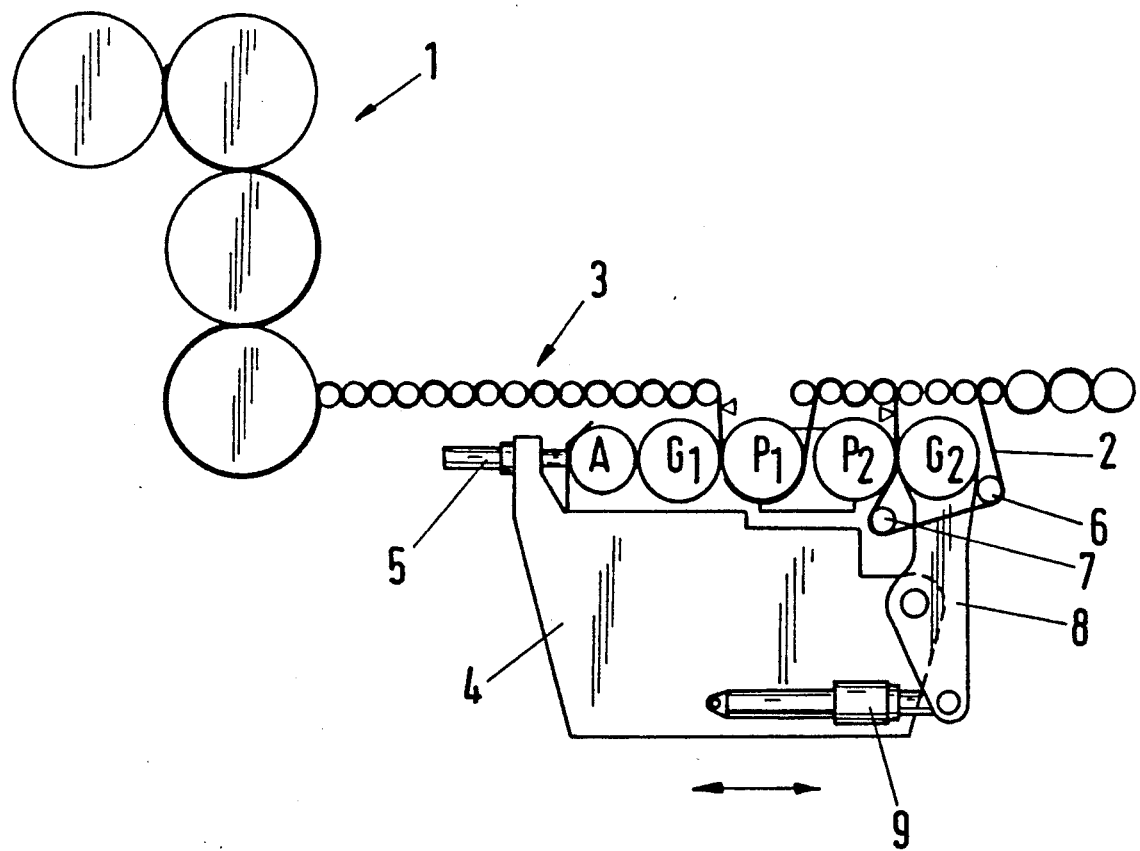
FIG. 3 shows a similar view of the system of FIG. 1 in its position of use for embossing both surfaces of the film.

In some cases, it will be desirable to emboss both surfaces of the same film. The manner in which this can be effected is apparent from FIG. 3. Initially, the frame 4 is located in a position in which the film is insertable into the first embossing calender, that is to say, into the nip between the rollers $P_1$ and $G_1$. The upper surface of the film is embossed in such nip in the manner described hereinbefore with reference to FIG. 1. After the upper surface of the film has been embossed, the film 2 is collected by the transfer arrangement 3 and advanced to the second embossing calender comprising the rollers $P_2$ and $G_2$. In the second embossing calender, the rear surface of the film, that is to say, the surface embossed in the manner described with reference to FIG. 2 is embossed and, after leaving the nip between the embossing roller $P_2$ and the counter-roller $G_2$, the film is advanced through the intermediary of guide rollers 6 and 7, to the transfer arrangement 3. The film 2, which has now been embossed on both surfaces, is advanced by the transfer arrangement for any desired further processing.

Other arrangements of the embossing calenders are also possible. Thus, for example, the horizontal bearing plane of the second embossing calender may be situated above or below the horizontal bearing plane of the first embossing calender on the common frame 4.

We claim:

1. An embossing calender arrangement for embossing thermoplastic plastics material films comprising a film calender for producing a film having first and second opposed major surfaces, an embossing calender assembly receiving said produced film and embossing at least one of said surfaces of said film, and transfer means for transferring said film from said film calender to said embossing calender assembly, through said assembly and from said assembly for further processing, wherein said embossing calender assembly comprises a first roller set defining a first roller nip whereby passage of said film through said first roller nip causes embossing of said first major surface, and a second roller set defining a second roller nip whereby passage of said film through said second roller nip causes embossing of said second major surface, means for mounting said first roller set and said second roller set, common frame means including both said means mounting said first roller set and said means mounting said second roller set and further including means for displacing said frame means horizontally with respect to said transfer means, said transfer means being disposed above said frame means, whereby displacement of said frame means to a first position provides a first mode of embossing wherein said first surface of said film is unilaterally embossed in said first roller nip, displacement of said frame means to a second position provides a second mode of embossing wherein said second surface of said film is unilaterally embossed in said second roller nip, and displacement of said frame means to a third position provides a third mode of embossing wherein said first and said second surfaces are sequentially embossed in said first and said second roller nips.

2. An arrangement as recited in claim 1 wherein said first roller set comprises a counter-roller, said counter-roller including a peripheral curved surface and resilient coating means formed on said curved surface; an embossing roller disposed adjacent said counter-roller, said embossing roller and said counter-roller jointly defining said first roller nip, and a pressure roller disposed adjacent said counter-roller and in contact therewith.

3. An arrangement as recited in claim 1 wherein said second roller set comprises a counter-roller, said counter-roller including a peripheral curved surface and resilient coating means formed on said curved surface, drive means operatively connected to said counter-roller, and an embossing roller disposed adjacent said counter-roller, said embossing roller and said counter roller jointly defining said second roller nip.

4. An arrangement as recited in claim 3 additionally comprising pivot means mounting said counter-roller for enabling pivotal movement of said counter-roller in a direction towards and away from said embossing roller, said pivot means comprising lever means operatively connected to said counter-roller; a pivot axis mounting said lever means, and hydraulic piston and cylinder means acting on said lever means.

5. The embossing calendar arrangement of claim 1, wherein the axes of said rollers in said first and second roller sets extend substantially horizontally.

* * * * *